(12) United States Patent
De Blois et al.

(10) Patent No.: US 12,000,294 B2
(45) Date of Patent: Jun. 4, 2024

(54) POWER WITHDRAWAL FROM A LP BODY AND SYSTEM FOR REMOVING DEBRIS

(71) Applicant: Safran Aircraft Engines, Paris (FR)

(72) Inventors: Nicolas Bertrand Georges De Blois, Moissy-Cramayel (FR); Clément Dupays, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 50 days.

(21) Appl. No.: 17/440,380

(22) PCT Filed: Mar. 18, 2020

(86) PCT No.: PCT/EP2020/057497
§ 371 (c)(1),
(2) Date: Sep. 17, 2021

(87) PCT Pub. No.: WO2020/188000
PCT Pub. Date: Sep. 24, 2020

(65) Prior Publication Data
US 2022/0154596 A1 May 19, 2022

(30) Foreign Application Priority Data
Mar. 18, 2019 (FR) ...................................... 1902732

(51) Int. Cl.
*F01D 25/00* (2006.01)
*F02K 3/02* (2006.01)
(52) U.S. Cl.
CPC .............. *F01D 25/002* (2013.01); *F02K 3/02* (2013.01); *F05D 2220/323* (2013.01)
(58) Field of Classification Search
CPC ................. F02K 3/02; F05D 2220/323; F05D 2260/607; F02C 9/18
See application file for complete search history.

(56) References Cited

U.S. PATENT DOCUMENTS 4,463,552 A * 8/1984 Monhardt ............... F01D 25/32
60/785
9,518,513 B2 * 12/2016 Pritchard, Jr. ............ F02C 9/18
(Continued)

FOREIGN PATENT DOCUMENTS

EP 2 623 750 A1 8/2013
FR 2 659 690 A1 9/1991
(Continued)

OTHER PUBLICATIONS

Chinese Office Action and Search Report for Chinese Application No. 202080022592.0, dated Jan. 10, 2024, with English translation.

*Primary Examiner* — David P. Olynick
(74) *Attorney, Agent, or Firm* — BIRCH, STEWART, KOLASCH & BIRCH, LLP

(57) ABSTRACT

The invention concerns a bypass turbomachine (1) with a primary flow path and a secondary flow path, comprising: —a low-pressure body comprising a low-pressure compressor (120) connected to a low-pressure turbine (122) via a low-pressure shaft (124), —a high-pressure body comprising a high-pressure compressor (130) connected to a high pressure turbine (132), via a high-pressure shaft (134), —a low-pressure power take-off system (220) comprising an electrical generator (226), configured to take power (W12) from the low-pressure body, wherein—the turbomachine comprises a debris removal system (500), located between the two compressors (226, 236), —the low-pressure power take-off system (220) is configured to take power (W12) from the low-pressure shaft (124) using the resistive torque of the electrical generator (226), in order to avoid a risk of surging.

9 Claims, 4 Drawing Sheets

(56) References Cited

U.S. PATENT DOCUMENTS

| | | | | |
|---|---|---|---|---|
| 10,644,630 B2* | 5/2020 | Smith | .................... | H02P 9/008 |
| 2015/0139775 A1* | 5/2015 | Kumar | ................... | F01D 9/041 |
| | | | | 415/121.2 |
| 2018/0354631 A1* | 12/2018 | Adibhatla | ............... | F02C 3/113 |
| 2020/0131996 A1* | 4/2020 | Hanlon | .................... | F02C 6/08 |

FOREIGN PATENT DOCUMENTS

| | | |
|---|---|---|
| FR | 2 983 911 A1 | 6/2013 |
| WO | WO 2016/020618 A1 | 2/2016 |
| WO | WO 2016/156739 A1 | 10/2016 |

* cited by examiner

POWER WITHDRAWAL FROM A LP BODY AND SYSTEM FOR REMOVING DEBRIS

GENERAL TECHNICAL FIELD

The invention relates to bypass and multi-spool gas turbine engines, particularly twin or triple spool, for aircraft, and more specifically the management of surge margins at compressor level.

With reference to FIG. 1, in a bypass gas turbine engine 10, a fan 11 takes off a flow of air which is divided in two: a secondary flow FS which is accelerated by the fan 11 and which provides most of the thrust and a primary flow FP, which passes through several compressors 12, 13, before entering a combustion chamber 14 and passing through several turbines 15, 16, which in particular drive the fan 11. These are respectively referred to as the secondary airflow and the primary airflow.

For example, in a bypass and twin-spool gas turbine engine 10, the primary airflow specifically comprises at least two compression 12, 13 and turbine 15, 16 stages. This gives, in the direction of flow of the fluid, a low-pressure compressor 12 (also known as a booster), a high-pressure compressor 13, the combustion chamber 14, a high-pressure turbine 15, and a low-pressure turbine 16. A so-called high-pressure shaft 17 connects the high-pressure elements 13, 15 and a so-called low-pressure shaft 18 connects the low-pressure elements 12, 16. The shafts 17, 18 are concentric.

The acronyms LP and HP will be used for low pressure and high pressure.

These two shafts 17, 18 generally do not turn at the same speed. In addition, they do not have the same inertia. Consequently, particularly in the slowdown phases, the LP compressor 12 (known as the N1 rating) slows down more slowly than the HP compressor 13 (known as the N2 rating), partly because of their different inertia. This results in a situation where the LP compressor 12 compresses more air than the HP compressor 13 can receive. This situation creates a risk of surge in the area of the booster (LP compressor 12). This phenomenon corresponds to significant and rapid fluctuations in the pressure downstream of the compressor in question. Once a surge has been triggered it can lead to flame-out of the combustion chamber. It furthermore generates considerable knocking on the blading of the compressor and can thus lead to mechanical damage.

The surge margin is defined as the minimum pressure difference to be obeyed between the working line of the low-pressure compressor (booster) and the surge line which delimits the region of the surge risk.

PRIOR ART

To palliate the surge risk, particularly in the LP compressor area 12, it is known to use the bleed valves 2 making it possible to expel an overpressure at the outlet of a compressor. They make it possible to migrate the working line of the LP compressor 12. These valves are generally referred to by the acronym VBV (Variable Bypass Valves). They comprise an aperture 21 opening into the primary airflow, a bleed airflow 22 to transfer the air, and an outlet 23 opening into the secondary airflow. The aperture 21 generally has the shape of a scoop or an openable and closable valve. The documents WO2016156739 and FR2983911 for example describe VBVs.

FIG. 2 illustrates a functional block diagram of a system comprising at least one VBV, which we will here call "VBV system", activated when a command CVBV is generated.

The VBV system is designed to be activated under various conditions.

A first condition is defined by a stabilized VBV law LVBVs, i.e. to expel a constant overpressure at a rating point given via the opening of the VBV. The law LVBVs is defined by f(N1; N2; Pressure; Mach), where N1 is the rating of the LP shaft and N2 is the rating of the HP shaft. This condition is combined with a setpoint offset OK to open/close VBVs as a function of the behavior of the VSVs (Variable Stator Vanes) which are then applied to the setpoint after stabilization. The setpoint offset is defined by f(gradient_VSV).

This condition is also combined with a deceleration bias offset OD of the LP shaft, defined by f(dN1/dt).

At each slowdown, a surge risk occurs and the VBVs are activated. Even in cruise phase, a significant use of the VBVs is observed due to various parameters (including engine control, the dynamics of the VSVs etc.) Consequently, due to their repeated activation, VBVs 20 quickly wear out.

Moreover, in general VBVs make it possible to expel toward the secondary airflow debris, i.e. objects foreign to the gas turbine engine which may have been ingested in the primary airflow of the engine through the low-pressure compressor inlet, thus protecting the combustion chamber. They are used in particular to ensure the expulsion of hail or water ingested through the primary airflow of the engine.

A second condition of opening of the VBVs is thus defined by a hail/water ingestion law LI, which controls the full opening of the VBVs on the basis of a law related to the conditions of the flight envelope, particularly pressure, temperature, and engine rating.

This dual use has complicated the development of VBVs, and an overly frequent activation of the VBV system causes it to wear out prematurely, making it necessary to over dimension it to limit this wear.

The French patent application reference FR2 659 690 is also known relating to internal combustion engines and more particularly gas turbine engines which are used for the propulsion of aircraft. In a particular embodiment, this patent sets out a method and a device for the removal and expulsion of foreign matter, such as ice and debris, from the primary flow path or engine core flow path.

Document WO2016/020618 also describes different solutions for resistive coupling of a generator to slow down the LP compressor.

OVERVIEW OF THE INVENTION

To solve the aforementioned problems, the invention makes provision for a bypass gas turbine engine with a primary airflow and a secondary airflow, arranged radially external to the primary airflow, said gas turbine engine comprising:
- a low-pressure spool comprising a low-pressure compressor connected to a low-pressure turbine via a low-pressure shaft,
- a high-pressure spool comprising a high-pressure compressor connected to a high-pressure turbine, via a high-pressure shaft,
- a low-pressure power withdrawal system comprising an electrical generator, configured to withdraw power from the low-pressure spool, wherein
- the gas turbine engine comprises a debris expulsion system, located between the two compressors, the low-pressure power withdrawal system is configured to withdraw power from the low-pressure shaft using the resistive torque of the electrical generator, on a withdrawal command of an electronic control unit, to slow down the low-pressure compressor and avoid the risk of a surge between the high-pressure compressor and the low-pressure compressor.

The debris expulsion system comprises a door located between the two compressors.

In an embodiment, the debris expulsion system is configured to be activated when hail or water is ingested, on command of an electronic control unit.

In an embodiment, the gas turbine engine further comprises a debris detection device configured to detect the presence of debris between the two compressors, wherein the debris expulsion system is configured to only be activated if the debris detection device detects debris, on activation command of an electronic control unit.

In an embodiment, the power withdrawal is configured to be controlled as a function of the ratings of the low-pressure compressor and of the high-pressure compressor, on command of an electronic control unit.

In an embodiment, the electronic control unit controls the power withdrawal as a function of the instantaneous variations of the ratings of the low-pressure compressor and of the high-pressure compressor.

In an embodiment, the debris expulsion system comprises at least one door suitable for being opened in a go no-go arrangement.

In an embodiment, the debris expulsion system is configured to be controlled in a go no-go arrangement, on command of an electronic control unit.

In an embodiment, the gas turbine engine comprises a dedicated electronic control unit, separate from a main electronic control unit of the gas turbine engine, configured to control the power withdrawal as a function of the instantaneous variations of the ratings of the low-pressure compressor and of the high-pressure compressor, on command of the main electronic control unit.

In an embodiment, the debris expulsion system is configured to be controlled in a go no-go arrangement, on command of an electronic control unit, in the event of a failure to maintain the surge margin through the low-pressure power withdrawal system, to expel an overpressure between the low-pressure compressor and the high-pressure compressor.

The invention also makes provision for an assembly comprising a gas turbine engine as previously described and an electronic control unit. The electronic control unit can be on board the gas turbine engine, like a FADEC, for example mounted in a compartment of a nacelle of the gas turbine engine, but could also be housed outside the perimeter of the gas turbine engine, for example in a mast or in the fuselage of the aircraft.

OVERVIEW OF THE FIGURES

Other features, aims and advantages of the invention will become apparent from the following description, which is purely illustrative and non-limiting, and which must be read with reference to the appended drawings, wherein.

DETAILED DESCRIPTION

Figure 3:
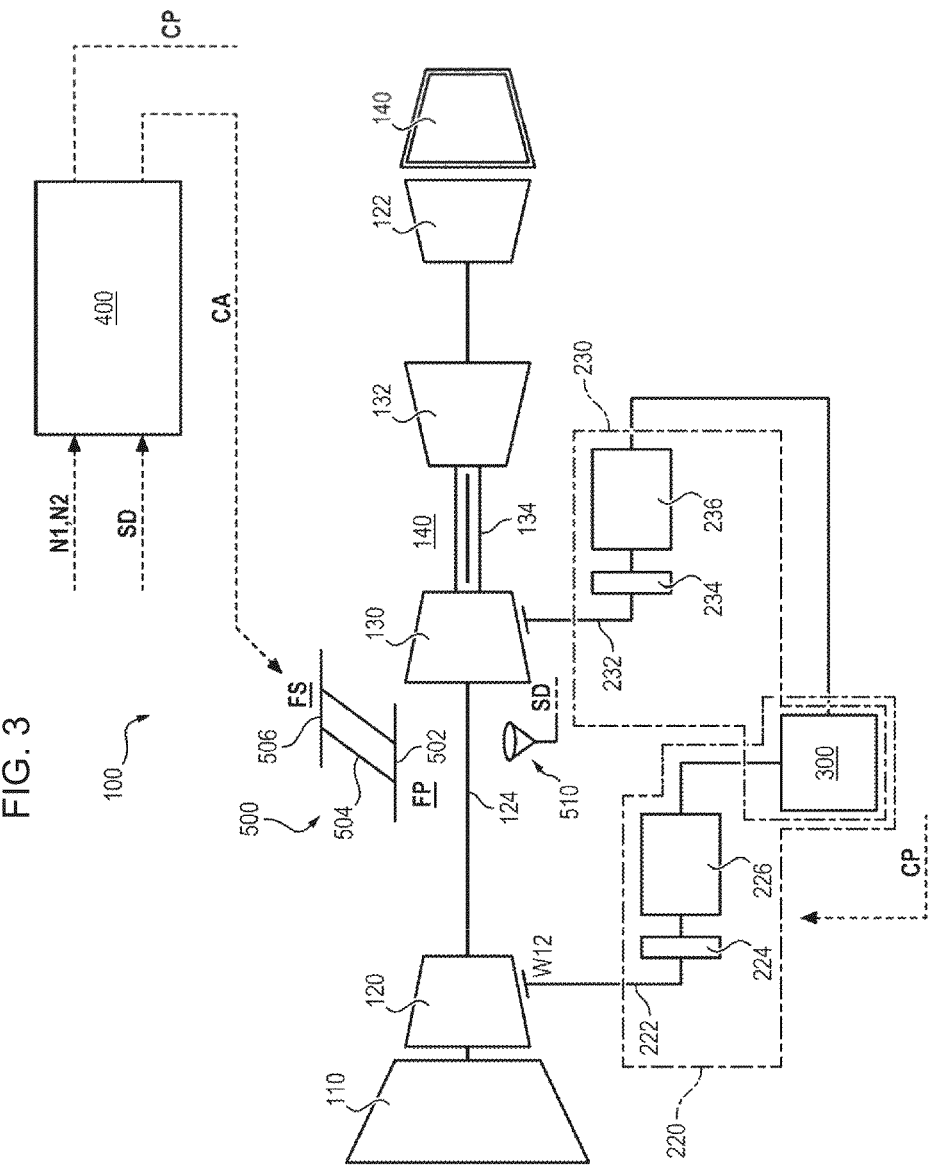
FIG. 3 shows a schematic view of a gas turbine engine according to an embodiment of the invention.

With reference to FIG. 3, a generic primary airflow of a bypass twin-spool fan gas turbine engine 100 can be seen, along with a portion of a secondary airflow.

It conventionally comprises, from upstream to downstream in the direction of flow of the gas, a fan 110, a low-pressure compressor 120, a high-pressure compressor 130, a combustion chamber 140, a high-pressure turbine 132, a low-pressure turbine 122 and a primary exhaust nozzle 140. The LP compressor (or booster) 120 and the LP turbine 122 are connected by a low-pressure shaft 124 and together form a low-pressure LP spool. The HP compressor 130 and the turbine 132 are connected by a high-pressure shaft 134 and together form, with the combustion chamber 140, a high-pressure HP spool.

The fan 110, which is driven, either directly, or by way of a reduction gear, by the LP shaft 124, compresses the air coming from the air intake scoop. This air is divided downstream of the fan between a secondary air flow FS which is directed directly toward a secondary nozzle through which it is ejected to participate in the thrust provided by the engine, and a so-called primary flux FP which enters into the gas generator, formed of the HP and LP bodies, then is ejected into the primary nozzle 140. The invention also covers the case where the two flows, primary and secondary are mixed before ejection.

Mechanical power is withdrawn from the shafts 124, 134, by example by direct drive or through power drives or via a reduction gear if the engine has one.

Where the LP spool is concerned, a power W12 is withdrawn, i.e. recovered, by an LP power withdrawal system 220, through a power drive 222 (or direct drive), either at the level of the LP compressor 120, the LP turbine 122, or at any other place on the LP shaft 124.

This power drive 222 can open onto a reduction gear 224 which is itself connected to an electrical generator 226 which converts the received power W12 into electrical power.

Figure 1:
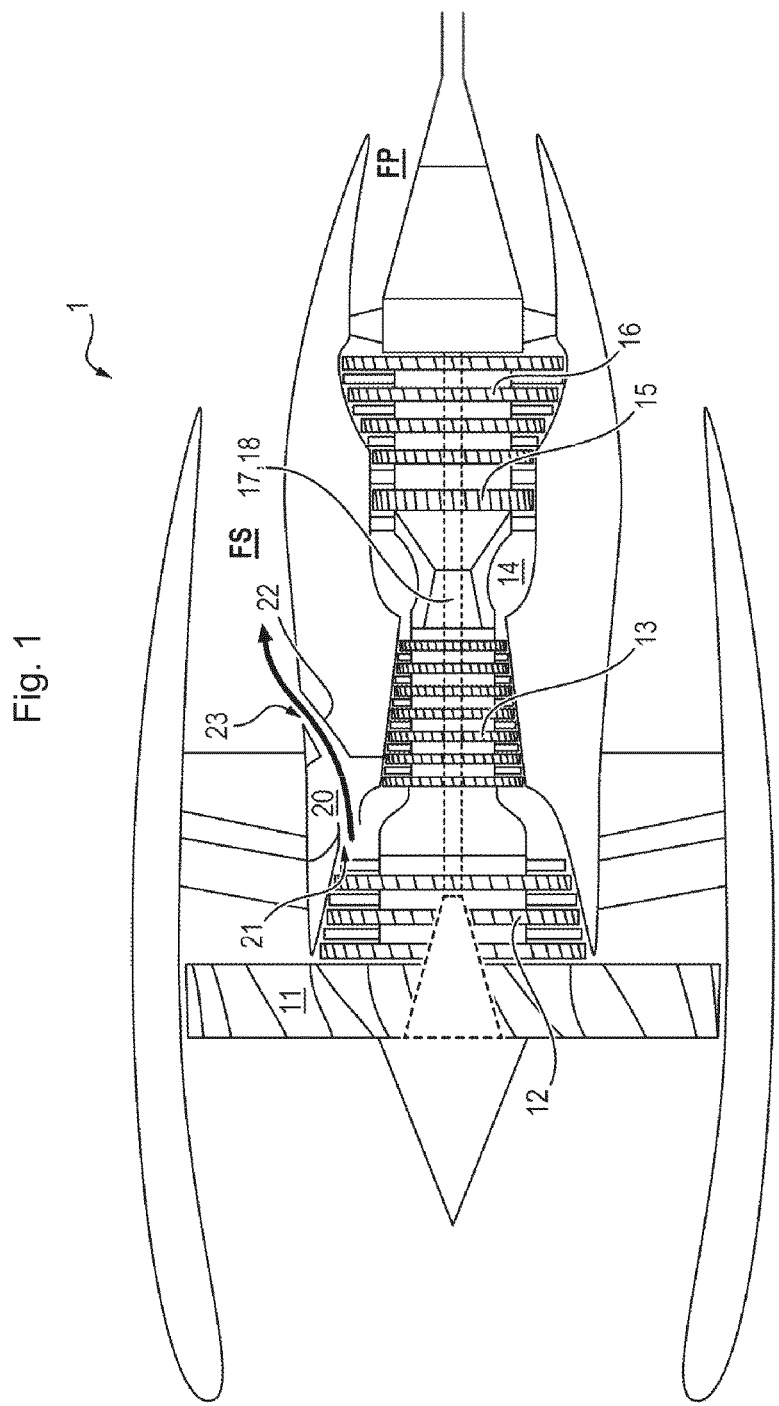
FIG. 1 shows a gas turbine engine.
Figure 2:
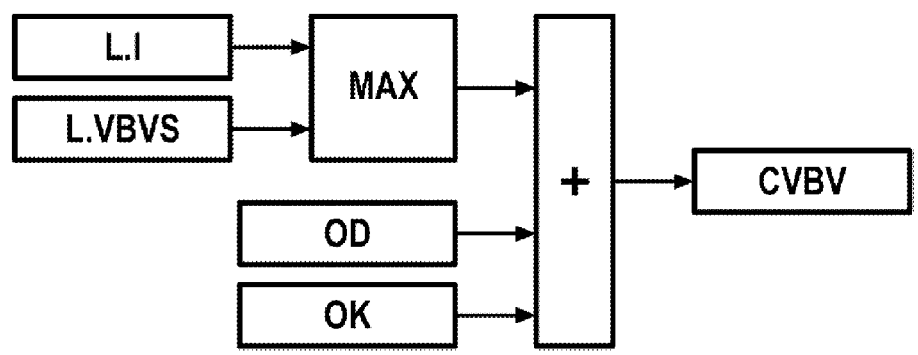
FIG. 2 shows a functional block diagram of a VBV of the prior art.

This can, as shown in FIG. 2, be stored in an electrical power storage means 300 or else sent directly, via an electrical motor for power injection, to one of the gas turbine engine shafts.

The electrical power storage means 300 can conventionally be a battery, for example of lithium-ion type, or for example a supercapacitor. Power electronics will generally interface between the generator and the power storage means 300.

In the same way, a power W13 can be withdrawn from the HP spool, by an HP power withdrawal system 230, either at the level of the turbine or at any other place on the HP shaft 20. Here again, it is extracted by an HP power drive 232 (or by direct drive). This power drive 232 can also generally open into a reduction gear 234 which is itself connected to an electrical generator 236 which converts the received power W13 into electrical power.

As previously, the reduction gear 234 is connected to an electrical generator 236 which converts the received energy W13 into electrical power.

This can, as is shown in FIG. 3, be stored in the electrical power storage means 300, which can be the same as for the energy W12.

In an embodiment, the generators 226, 236 are separate, and preferably housed in axially and/or circumferentially different places in the gas turbine engine. However, it is possible, by way of residual current devices or coupling, to use a single generator which can withdraw from the LP spool or the HP spool.

The gas turbine engine 100 further comprises an electronic control unit 400 configured to receive sensor data, pilot instructions, setpoints etc. to process them and to issue commands, information, etc. The electronic control unit 400 is generally an on-board main electronic control unit, of FADEC (Full Authority Digital Engine Control) type which acts as the interface between the cockpit of the aircraft and the gas turbine engine 100. The main electronic control unit of FADEC type is integrated into the propulsion assembly which comprises the gas turbine engine. It is for example installed in a compartment of a nacelle surrounding the gas turbine engine, but it can also be outside the perimeter of the gas turbine engine, such as in the mast or the fuselage of the aircraft. It comprises one or more processors and memory needed to process the data. Alternatively, the electronic control unit 400 can be separate from the main electronic control unit of FADEC type. Alternatively, several electronic control units, including a FADEC on-board electronic control unit, are provided, and share the actions.

The power withdrawal can be activated or deactivated on command of the electronic control unit 400. To do this, it is assumed that the power withdrawal systems 220 and 230 dispose of appropriate technical means, known to those skilled in the art and not detailed here. These means may consist in clutches, couplings, free wheels etc., or else have a generator constantly driving the power electronics that drive the power withdrawal. The power withdrawal can also be activated at different levels: the power withdrawal system 220, 230 disposes of suitable power electronics, known to those skilled in the art.

The LP power withdrawal system 200 has the function of slowing down the N1 rating, i.e. the low-pressure spool and more specifically the low-pressure compressor 120 to avoid the risk of surges. To do this, the LP power withdrawal system 200 receives a withdrawal command CP from the electronic control unit 400 which has been generated taking into account the N1 rating of the low-pressure compressor 120 and the N2 rating of the high-pressure compressor 130, giving CP=f(N1, N2, t) where f represents a function and t time. The withdrawal command CP also takes into account the Mach number and pressure, giving CP=f(N1, N2, t, Mach number, Pressure). This law is called LS in FIG. 4.

Moreover, it is still possible to take into account the OK and OD information described in the introduction.

The data N1 and N2 may be obtained from computation or estimation.

More specifically, the withdrawal command CP depends on the variations of the N1 and N2 ratings. This gives CP=f(dN1/dt, dN2/dt, t, Mach number, Pressure) where f represents a function.

In a particular embodiment, the withdrawal command CP is generated, for a given pressure and Mach number, as soon as a difference between dN1/dt and dN2/dt is greater than a certain threshold. This results in a slowdown of the LP shaft substantially adapted to that of the HP shaft.

The data dN1/dt and dN2/dt may be computed by the electronic control unit 400 or, for more responsiveness, by a dedicated electronic control unit (not shown) at the level of the generator or generators.

Thus, the resistive torque of the generator 226 is used to slow down the LP compressor 120. The electricity produced by the generator 226 can be used in different ways (storage or reinjection into another shaft). The document WO2016/020618 describes different solutions.

Use of the VBV system to satisfy the operability requirements of the gas turbine engine is no longer necessary. Use of the VBV system does however remain necessary to expel debris.

However, the management of debris expulsion is no longer provided. To do this, the gas turbine engine 100 comprises a debris expulsion system 500 comprising a door 502 opening between the two LP 120 and HP 130 compressors, an expulsion airflow 504 and an outlet 506 opening into the secondary airflow. There is a plurality of doors 502 and outlets 506 circumferentially around the shaft of the gas turbine engine. The debris expulsion system 500 can be housed in an intermediate casing.

The debris expulsion system can be structurally similar to VBVs. However, it is not activated in the same phases.

Figure 4:
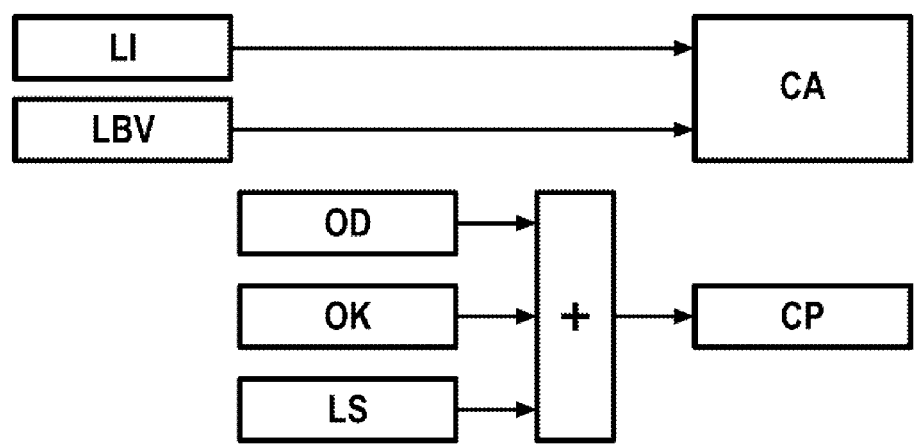
FIG. 4 shows a functional block diagram of an embodiment of a gas turbine engine according to an embodiment of the invention.

These different phases are illustrated in FIG. 4, by comparison with FIG. 2 of the prior art.

The debris expulsion system 500 is driven on an electronic control unit command 400.

Provision is also made for a debris detection device 510. The detection can where applicable be direct, for example on the basis of an optoelectronic system for detecting objects from a certain height and above, entering the LP compressor and/or building up at the inlet of the HP compressor. This detection device 510 may also react to a risk of debris being present, for example by taking into account the pressure prevailing between the two HP or LP compressors, or else other parameters which are modified in the presence of debris. For example, it can detect conditions favorable to the appearance of a surge which might be caused by the overall dimensions of the inlet of the HP compressor. The debris detection device 510 generates a signal SD which is sent to the electronic control unit 400 when debris is detected (or suspected).

Owing to an implemented ingestion law LI, the electronic control unit 400 generates an activation command CA to activate the debris expulsion system only when the debris detection system detects debris. This means that the debris expulsion system 500 is relatively little-used by comparison with a conventional VBV system. Stress is lower, as is wear.

It may occur that the command CP is not enough to sufficiently slow down the LP compressor, or that the slowdown of the LP compressor is not enough to move away from the surge region. To palliate this, a protection law LPB of the LP compressor is implemented: it generates an activation command CA of the debris expulsion system to expel overpressure. In an embodiment, the criterion is a latency time between 2 s and 5 s if the application of a resistive torque does not have the desired effect on the surge margin.

The debris expulsion system 500 can be of a more simple design than VBVs. One example that can be mentioned is the doors 502 which can be designed to be in two states only: open or shut (go no-go). Similarly, the commands generated by the electronic control unit 400 can be binary and thus correspond either to an open door or to a shut door.

In a particular embodiment, the invention can be implemented on the basis of an existing gas turbine engine comprising an LP withdrawal system and a VBV system.

The invention can also be described as a method comprising a step in which the VBV system is activated under the aforementioned conditions for the debris expulsion system 500. The VBV system is therefore generally no longer activated to improve the surge margin, since this function is fulfilled by the activation of the power withdrawal system under the aforementioned conditions.

The invention claimed is:

1. A bypass gas turbine engine comprising:
a low-pressure spool comprising a low-pressure compressor connected to a low-pressure turbine via a low-pressure shaft;
a high-pressure spool comprising a high-pressure compressor connected to a high-pressure turbine via a high-pressure shaft;
a low-pressure power withdrawal system comprising an electrical generator and configured to withdraw power from the low-pressure spool, wherein the low-pressure power withdrawal system is configured to withdraw power from the low-pressure shaft using a resistive torque of the electrical generator on a withdrawal command of an electronic control unit to slow down the low-pressure compressor and avoid a surge between the high-pressure compressor and the low-pressure compressor;
a debris detection device configured to detect a presence of debris between the low-pressure compressor and the high-pressure compressor; and
a debris expulsion system located between the low-pressure compressor and the high-pressure compressor, wherein the debris expulsion system comprises at least one door being opened only when the debris detection device detects a debris.

2. The gas turbine engine of claim 1, wherein the debris expulsion system is further configured to be activated when hail or water is ingested, on command of the electronic control unit.

3. The gas turbine engine of claim 1, wherein the power withdrawal is configured to be controlled as a function of rotational speed of the low-pressure compressor and of the high-pressure compressor, on command of the electronic control unit.

4. The gas turbine engine of claim 3, wherein the electronic control unit controls the power withdrawal as a function of an instantaneous variations of rotational speed of the low-pressure compressor and of the high-pressure compressor.

5. The gas turbine engine of claim 1, wherein the at least one door is opened in a go no-go arrangement.

6. The gas turbine engine of claim 1, wherein the debris expulsion system is further configured to be controlled in a go no-go arrangement, on command of the electronic control unit.

7. The gas turbine engine of claim 1, further comprising a dedicated electronic control unit, separate from the electronic control unit of the gas turbine engine, and configured to control the power withdrawal as a function of an instantaneous variations of rotational speed of the low-pressure compressor and of the high-pressure compressor, on command of the electronic control unit.

8. The gas turbine engine of claim 1, wherein the debris expulsion system is further configured to be controlled in a go no-go arrangement, on command of the electronic control unit, in an event of a failure to maintain a surge margin through the low-pressure power withdrawal system, to expel an overpressure between the low-pressure compressor and the high-pressure compressor.

9. A propulsion assembly for an aircraft, comprising the gas turbine engine of claim 1 and the electronic control unit able to generate the withdrawal command to slow down the low-pressure compressor.

* * * * *